United States Patent [19]

Walter et al.

[11] 4,200,121

[45] Apr. 29, 1980

[54] QUICK-CLOSURE COUPLING FOR HYDRAULIC LINES

[75] Inventors: Friedrich C. Walter, Karlsruhe; Ludwig Portele, Ettlingen, both of Fed. Rep. of Germany

[73] Assignee: Argus Gesellschaft mbH, Ettlingen, Fed. Rep. of Germany

[21] Appl. No.: 875,555

[22] Filed: Feb. 6, 1978

[30] Foreign Application Priority Data

Mar. 19, 1977 [DE] Fed. Rep. of Germany ....... 2712117
Apr. 6, 1977 [DE] Fed. Rep. of Germany ....... 2715417

[51] Int. Cl.$^2$ .................. F16L 29/00; F16L 37/28
[52] U.S. Cl. .................. 137/614.05; 251/149.6; 137/614
[58] Field of Search .......... 137/614.01, 614.05, 137/614.06, 614, 614.02, 614.03; 251/149.6, 89.5

[56] References Cited

U.S. PATENT DOCUMENTS

| | | | |
|---|---|---|---|
| 2,637,572 | 5/1953 | Bruce | 137/614.02 |
| 2,706,646 | 4/1955 | Olson | 137/614.04 |
| 2,735,696 | 2/1956 | Omon et al. | 137/614.05 |
| 3,236,251 | 2/1966 | Hansen | 137/614.05 |
| 3,348,575 | 10/1967 | Simak | 137/614.05 |
| 3,367,366 | 2/1968 | Oliveau et al. | 137/614.05 |
| 3,791,411 | 2/1974 | Bogeskov et al. | 137/614.02 |

*Primary Examiner*—Martin P. Schwadron
*Assistant Examiner*—A. Michael Chambers
*Attorney, Agent, or Firm*—Max Fogiel

[57] ABSTRACT

A quick-closure coupling for hydraulic lines in which two insertable coupling halves are lockable in a coupling position, and are constructed in the form of a plug valve and a sleeve valve, each having a closure piece. The closure piece is spring loaded in the closure direction, and held in a closed position when the coupling halves are separated. One of the coupling halves is provided with a stop which restricts a valve stroke of the closure piece in the opening position. The other coupling half has the closure piece loaded with a stronger spring and has a valve stroke equal to twice the opening stroke of the other closure piece. One of the coupling halves has a closure piece which can execute the opening stroke, and has a locking device which is ready to lock due to axial displacement of the closure piece beyond a single opening stroke. After returning the closure piece to its opening position corresponding to the single valve stroke, the locking device reaches a stop position restricting the valve stroke to this opening position. But the locking device is moved back during disconnection of the coupling halves to its release position, permitting thereby a double valve stroke. The locking device may be in the form of a stop spring loaded in a direction of its locking position.

6 Claims, 12 Drawing Figures

QUICK-CLOSURE COUPLING FOR HYDRAULIC LINES

BACKGROUND OF THE INVENTION

There are already known in the art quick closure couplings for hydraulic lines comprising a plug valve and a sleeve valve, each with a closure piece held in the closed position by spring action. Such couplings are used, for instance, for the coupling of accessory devices to the hydraulic system of utility vehicles.

In order to make possible the coupling and uncoupling of a pressureless coupling half with a pressure-loaded coupling half, the closure piece of the coupling half on the pressureless side can be moved by twice the opening stroke while the opening stroke of the closure piece of the other coupling half is limited by a stop which is contacted by the closure piece in the opening position. Since the closure piece of the coupling half on the pressure side is under spring pressure and flow medium pressure, this closure piece remains at rest during coupling and the closure piece, displaceable by twice the opening stroke, of the other coupling half undergoes an axial displacement exceeding the single opening stroke. If flow medium pressure is applied to the coupling half which first was pressureless during coupling, there appears pressure compensation between the two closure pieces and they attain their opening positions under the action of the closure spring of the closure piece first displaced by twice the opening stroke; as a rule, this spring is stronger than the closure spring in the other coupling half. This opens the flow through such a coupling.

The trouble with these couplings appears to be that in the opening position the closure piece, which is not held against its fixed stop and is axially movable by twice the double opening stroke, it is so-to-speak floating and can make axial movements beyond its single opening position, depending on operating conditions, especially with pressure surges. These axial movements of this closure piece of one coupling half are followed by the closure piece of the other coupling half; in this latter coupling half, there will develop changes in the flow cross-section and hence undesirable changes of the flow conditions in the coupling. Under extreme operating conditions there may be an unwanted closing of the valve, completely blocking the entire hydraulic system.

Many attempts have been made to eliminate the hazard of unwanted closing of such valves under extreme operating conditions. However, these attempts were rather unsuccessful. In particular, the attempt has been made to design the closure springs of the two coupling halves in such a way that the closure piece, axially closable via the double opening stroke, after the opening of the valves is held in a stable opening position in the operating range under consideration. Satisfactory results were obtained for normal operation; however, operational safety under extreme conditions, eliminating a sudden closure of such a flow medium coupling, was not achieved.

This defect will be remedied by the invention. It is an object to improve such couplings in such a way that they cannot be closed when pressure is applied to one coupling half, even during pressure surges, reversals of the flow direction and high flow rates, without impairing their ability to be coupled.

Another object of the present invention is to provide an arrangement of the foregoing character which is substantially simple in construction and may be economically fabricated.

A further object of the present invention is to provide a quick-closure arrangement, as described, which may be readily maintained in service and which has a substantially long operating life.

SUMMARY OF THE INVENTION

The objects of the present invention are achieved by providing that the coupling half whose closure piece can perform the double opening stroke has a locking means for the closure piece; this locking means, due to axial displacement of the closure piece beyond the simple opening stroke, gets ready to lock, and after returning the closure piece to its opening position corresponding to the single valve stroke gets into a stop position restricting the valve stroke to this opening position; however, upon decoupling the coupling halves, the locking means is moved to its release position, again permitting the double valve stroke.

Hence the present invention involves assigning to the mentioned coupling half a movable stop for the closure piece which, in case of need, restricts the opening stroke of the closure piece in the normal opening position and prevents this opening stroke from being exceeded, since this would result in a movement of the closure piece of the other coupling half in the closed direction.

In the coupling of another embodiment, the coupling half whose closure piece is movable by twice the opening stroke has locking means movable between a release position and a locked position restricting the valve stroke of the closure piece to the single opening stroke; this locking means is held by spring action in its release position, but upon the appearance of flow in the valve, is moved by a drive means responding to this flow to the locked position, overcoming the spring force.

When joining (coupling) the coupling halves, the closure piece, movable by twice the opening stroke, of the pressureless coupling half experiences an axial displacement by twice the opening stroke, while the pressure-loaded closure piece of the other coupling half remains in the closed position. If flow medium pressure is applied to the closure piece, axially displaced by twice the opening stroke of the coupling half which is pressureless at the outset, due to the predominating spring force of the closure spring assigned to this closure piece, there occurs an axial displacement of the closure pieces; since the face sides of the two closure pieces are apart, the closure piece, first having remained in the closed position, is moved to its open position which is limited by a fixed stop. At the start of the opening process which takes place mainly under the static pressure building up gradually in the coupling half which was pressureless earlier, with this coupling, the locking means remains in its release position caused by spring force. Only after there is flow in the valve, hence after displacement of the two closure pieces to their open position, the drive means responding to flow in the valve moves the locking means to a locked position where the closure piece movable by twice the opening stroke is secured against axial displacement from its open position corresponding to the simple opening stroke. Accordingly, with this approach, both closure pieces have their open position locked towards one side as long as there is flow in the valve.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
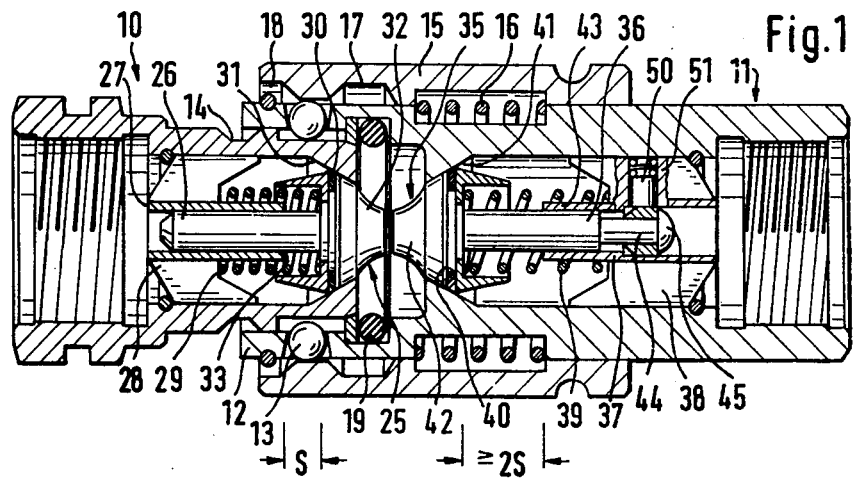
FIG. 1 shows the two halves of a first embodiment of the coupling in the decoupled but partially assembled state immediately before coupling or after decoupling.

The quick closure coupling shown in FIGS. 1 to 3 comprises a plug valve 10 and a sleeve valve 11 which are hereinafter called coupling halves, regardless of their partially different design. In the coupling position shown in FIGS. 2 and 3, the plug valve 10 is inserted in the one-sidedly open sleeve portion 12 of sleeve valve 11 and held by means of locking balls 13 which engage a circumferential groove 14 of the plug valve and are held in their locking position by a sleeve 15 sliding on the housing of the sleeve valve. The sleeve is supported in the axial direction by means of a spring 16 between the sleeve and the housing of the sleeve valve. During an axial displacement of sleeve 15 relative to the sleeve valve, depending on the direction of displacement of sleeve 15, the locking balls 13 may radially withdraw into one of the circumferential annular grooves 17, 18 of sleeve 15; in these positions coupling or uncoupling of the two coupling halves is possible with the rim bordering the annular groove 14 of the plug portion on the leading (forward) side passing the area of the locking balls. Sealing between the sleeve portion and the plug portion is provided by a ring seal 19 held in sleeve section 12. So far the coupling halves are within the state of the art and require no further explanation.

Both coupling halves have closure pieces which are movable in the axial direction and are loaded with closure springs in the closed direction. Thus, the plug valve 10 has a closure piece 25 in the shape of a valve cone from which a stem 26 extends into the valve. This guide stem is enclosed by a guide sleeve 27 which is fixed in a known manner in the housing of the plug valve by wings 28 extending through the annular flow channel. Between these wings (fins) 28 and the rear side of the valve cone there extends a preloaded closure spring 29 which pushes the valve cone, which has a seal 30 on its circumference to contact a conic sealing surface 21 in the housing of the plug valve. The conical closure piece 25 has a cone-shaped head which projects beyond the end surface of the plug valve when the closure piece is in the closed position.

As far as the closure piece is concerned, the sleeve valve 11 is designed similar to the plug valve. The closure piece 35 is again a valve cone from which a guide stem 36 extends into the valve. This guide stem is held again in a guide sleeve 37 which in turn is fixed in the sleeve valve housing, by means of wings 38 extending radially through the flow channel. Between the wings (fins) carrying the guide sleeve 37 and the rear side of the closure piece there extends a preloaded closure spring 39 which loads the closure piece in the closed direction and holds it in the closed position as shown in FIG. 1 when the coupling halves are separate. In this closed position, a peripheral seal 40 of the valve cone is in sealing contact with an inner cone surface 41 of the sleeve valve while a cone head 42 extending away from the valve cone on the side remote from the guide stem 36 projects into the space enclosed by the sleeve.

The stroke S of the plug valve is restricted by the forward face side 33 of the guide sleeve 27 which holds the guide stem 26 which can shift axially. By contrast, in the sleve valve, the corresponding face side 43 of the guide sleeve 37 has twice as large a distance from the rear side of closure piece 35 so that the latter can perform a stroke twice as large as closure piece 25 in the plug valve. Also, the closure spring 39 of the sleeve valve is stiffer than the closure spring 29 in the plug valve.

On the side removed from the closure piece 35, a stem 44 of smaller diameter extends from guide stem 36 and terminates in a head 45. In the area of this stem 44, a locking sleeve 46 can move in guide sleeve 37. This locking sleeve 46, on the side facing the guide stem 36, has an oblique surface 47 and encloses the stem 44 with play (tolerance) 48. The locking sleeve 46 has a diameter slightly larger than that of guide stem 36. In the closed position of the sleeve valve shown in FIG. 1, the locking sleeve supports a locking bolt 50 which is held movably in a cross guide 51 of the sleeve valve and is held in contact with the locking sleeve 46 by means of a compression spring 52 held by the housing of the sleeve valve. The space between the side of locking bolt 50 facing guide stem 36 and an offset 53 limiting the guide stem 36 equals the single opening strokes.

When coupling the two coupling halves, the valve cone heads 32, 42 of the two closure pieces 25, 35 make contact. It is assumed that the plug valve is connected to a hydraulic line under flow medium pressure, while the sleeve valve is connected to a pressureless hydraulic line. Because of the rear side flow pressure on the closure piece 25 in the plug valve and the loading of this closure piece by the closure spring 29, the closure force acting on this closure piece prevails and during coupling the two halves, the closure piece 35 loaded solely by the closure spring 39 in the closed direction, is axially shifted by twice the opening stroke. This is shown in FIG. 2.

Figure 4:
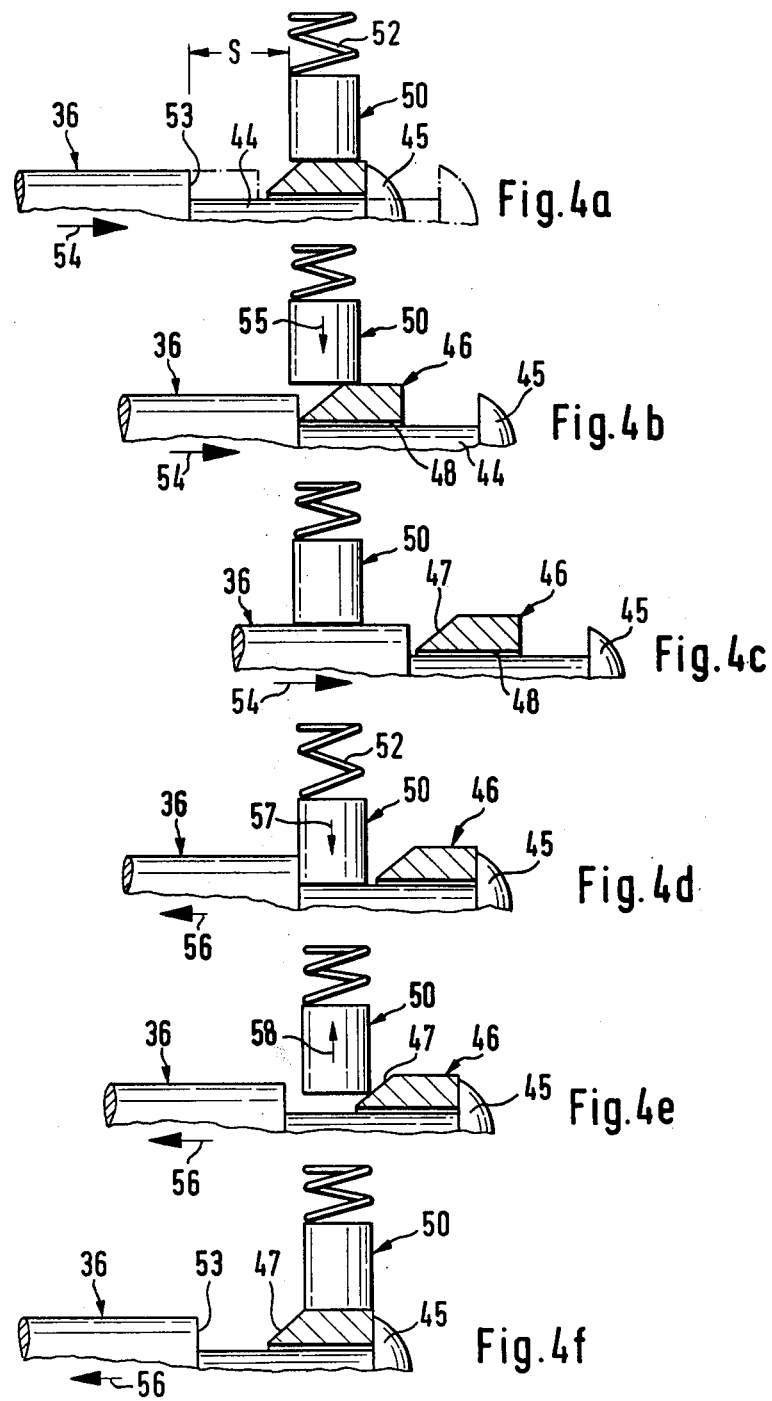
FIGS. 4a to f show schematics of various positions of the releasable stop of the one coupling half for restricting the closure piece in the open position.

With this axial shift of closure piece 35 indicated by arrows 54 in FIGS. 4a to 4c, after executing the single opening stroke, the rear-side face edge 53 of the guide stem strikes (contacts) locking sleeve 46; the latter is then axially shifted from its position supporting locking bolt 50 in the opening direction of the closure piece 35. The locked position of the locking sleeve is shown in FIG. 4a, while FIG. 4b shows the start of the take-along (engagement) of locking sleeve 46 and FIG. 4c the shift of the locking sleeve from the locking position shown in FIG. 1. The axial extent of the oblique surface 47 of locking sleeve 46 is smaller than the width of locking bolt 50. During the shift of the locking sleeve from the position supporting the locking bolt 50, the shell of the guide stem 36 gets under the locking bolt before the latter loses its support by the locking sleeve 46. In the coupling position illustrated in FIG. 2, corresponding to FIG. 4c, the locking bolt 50 has lowered onto the guide stem 36 of the closure piece 35, as shown by arrow 55 in FIG. 4b, and the closure piece is in an opening position corresponding to twice the valve stroke.

When the sleeve valve 11 is charged with flow medium pressure, there is a compensation of the rear-side flow medium pressure of the plug-side closure piece 25 and both closure pieces whose heads 32, 42 are in contact, under the prevailing action of the closure spring 39, assume an opening position corresponding to the single valve stroke. In this position, the stroke of the closure piece 25 of the plug valve 10 is restricted by the stop provided by face side 33 of the guide sleeve 27. During this movement indicated by arrow 56, the locking sleeve 46, axially displaced from the support region of the locking bolt, remains at rest till the carrier head 45 of the stem 44 connected to the guide stem 36 engages the rear side of the locking sleeve 46. Upon reaching an opening position of closure piece 35, equivalent to the single valve stroke, the guide stem 36 gets out of the support range of the locking bolt 50 and the latter drops onto bolt 44, as shown by arrow 44 in FIG. 4d. Thus locking bolt 50 engages the rear-side face surface 53 of guide stem 36 and locks the closure piece 35 in its opening position—in the same manner as is the case with stop 33 for the closure piece 25 of the plug valve. Then both closure pieces which are in their opening positions, contact fixed stops. Then pressure surges in the hydraulic system cannot initiate a shift of the closure pieces and thereby an unwanted closing of the coupled valves. FIGS. 3 and 4d illustrate this locked position.

Figure 2:
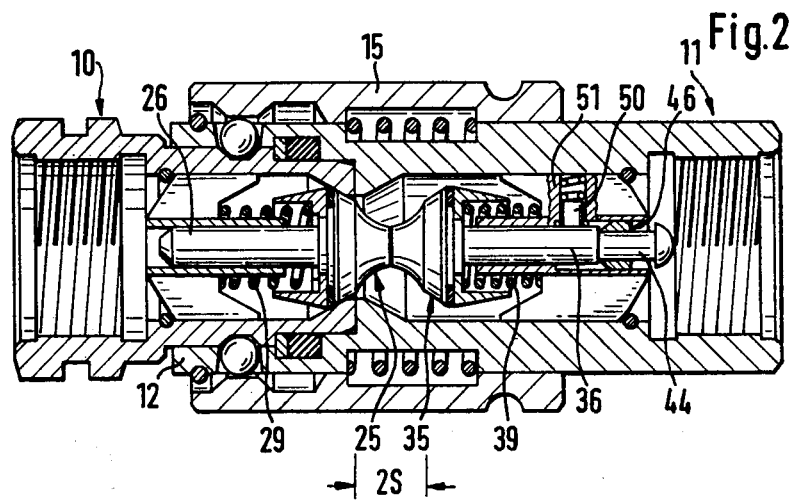
FIG. 2 shows the quick-closure coupling of FIG. 1 with assembled coupling halves and locked in this coupling position, one coupling half carrying pressure and the other pressureless.

The locking of closure piece 35 in the open position shown in FIG. 2 against a further axial shift of the closure piece in the open position, which is equivalent to a closing of the closure piece 25 in the plug valve, can be cancelled only by decoupling (uncoupling) the two coupling halves. During uncoupling of the two coupling halves, both closure pieces 25, 35, due to the loading by the closure springs 39, 29 (and possibly by flow medium pressure) are moved to their closed positions. During this axial movement of the closure piece 35 in the closed direction (according to arrow 56 in FIGS. 4e and 4f), the locking sleeve 46 is dragged along from the position shown in FIG. 4d, with the forward oblique surface 47 engaging the locking bolt (FIG. 4e) and lifting it in the direction of arrow 58 to its release position shown in FIGS. 1 and 4f.

Figure 3:
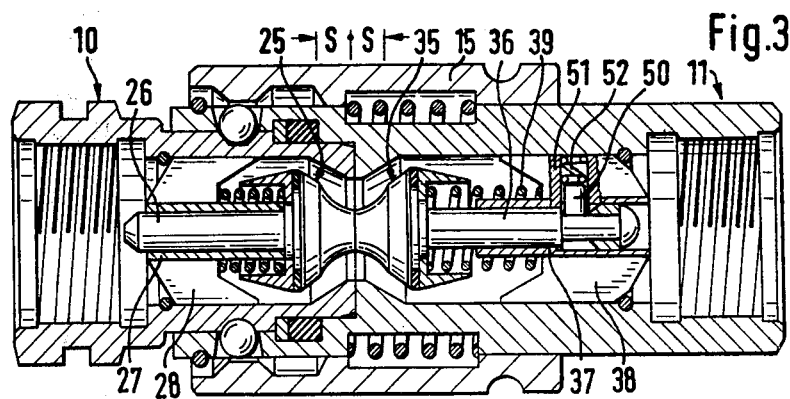
FIG. 3 shows the coupling as in FIG. 2, but both coupling halves under pressure, and therefore with the closure pieces in the open positions.
Figure 5:
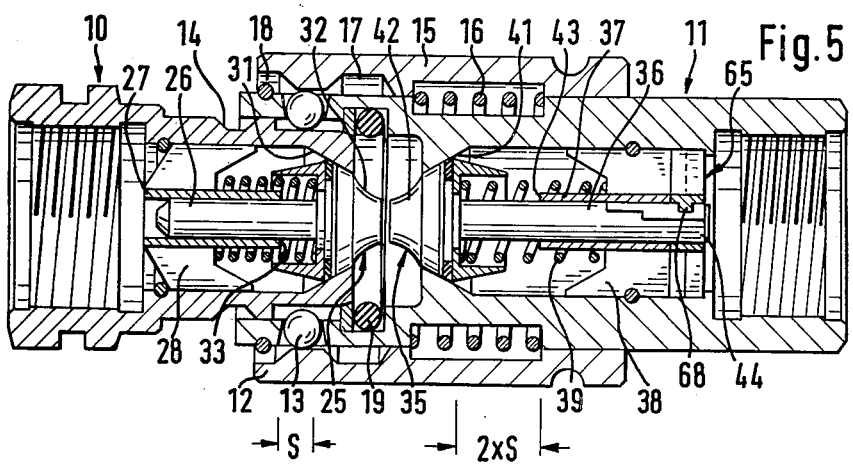
FIG. 5 shows the two halves of a coupling in accordance with claim 6 in the uncoupled but partially inserted state immediately before coupling or after decoupling.
Figure 6:
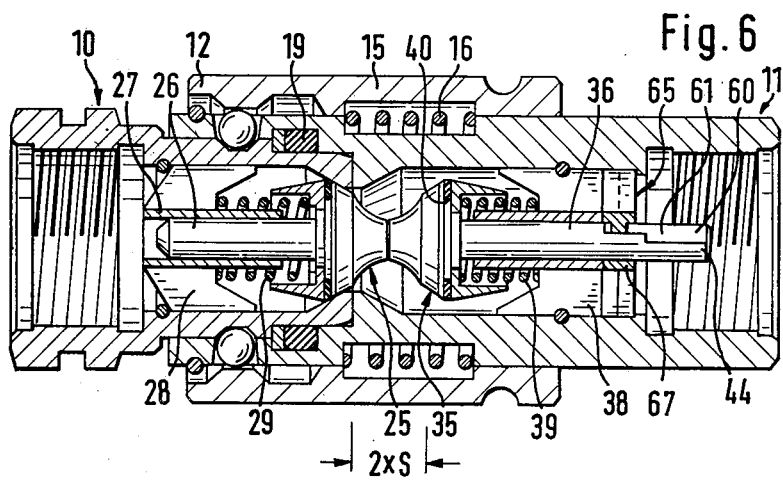
FIG. 6 shows the coupling of FIG. 5 with inserted coupling halves locked in this coupled position, with one coupling half under pressure and the other pressureless.
Figure 7:
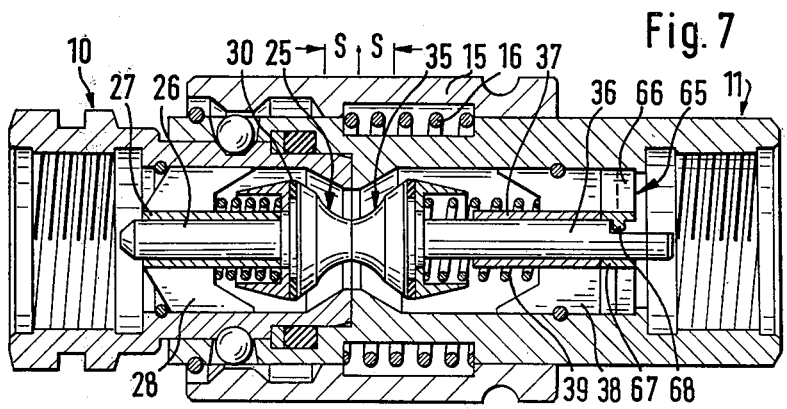
FIG. 7 shows the coupling as in FIG. 6, but both coupling halves under pressure, and therefore with the closure pieces in the open positions.

With the embodiment illustrated in FIGS. 5 to 7 corresponding to the second approach, the same reference numerals are used as for identical parts in FIGS. 1 to 3. From the guide stem 36 of the coupling half which is a sleeve valve, there extends a stem 44 in which a longitudinal cutout 60 extends by an amount which is slightly larger than twice the opening stroke of the valve. The center of the longitudinal cutout has a detent contour 161 which extends to both sides of the longitudinal cutout 60 perpendicular to it over a preset peripheral angle. FIGS. 5 and 6 show the position of this groove-like detent contour 61 in lengthwise sections which are displaced relative to each other by the preset peripheral angle mentioned earlier. The rear-side end of guide sleeve 37 has a blade grid 65 whose load 66 is carried by a hub portion 67. The hub is held rotatably on the stem section 44. A detent cam 68 extending radially inward from the inside contour of the hub engages the longitudinal cutout 60 in stem section 44. In the latter position, equivalent to the release position of the locking means, the blade grid 65 is held by a torsion spring (not shown) acting on the blade grid.

When coupling the two coupling halves, the heads 32, 42 of the two closure pieces 25, 35 make contact with each other. It is assumed that the plug valve is connected to a hydraulic line under flow medium pressure, while the sleeve valve is in a pressureless hydraulic line. Due to the rear-side flow medium pressure on closure medium 25 in the plug valve, and the load on this closure piece by closure spring 29, the closing force acting on this closure piece prevails and during coupling of the two halves, only the closure piece under the action of the closure spring 39 in the closed direction is axially shifted by twice the opening stroke. With this axial movement of the closure piece 35 and the associated guide stem 36 with the stem section 44, the guide stem moves relative to the detent cam 68 which engages the longitudinal cutout 60 from the position shown in FIG. 5 to the position of FIG. 6.

If the sleeve valve 11 is charged with flow medium pressure, there is compensation for the rear-side flow medium pressure on the plug-side closure piece 25; both closure pieces whose heads 32, 42 are in contact with each other, under the prevailing action of the closure spring 39 assume an open position corresponding to the single valve stroke; in that position, the stroke of the closure piece 25 of plug valve 10 is restricted by the stop provided by the face side 33 of the guide sleeve 27. Then the open position is attained.

Upon lifting the closure piece 25 from the associated mating sealing surface in the plug valve 10, flow increases steadily in the valve until the full opening position of the valve is reached. This flow influences the blade grid rotatably mounted on the stem section 44 in the area of the rear of the guide sleeve 37. The blade grid attempts, against the action of the torsion spring (not shown) holding the locking means 65 in the release position, to carry out a rotation in the peripheral direction in accordance with the sense of rotation provided by the media flow depending on the vanes or blades. This rotation of the locking means is opposed by the engagement of the locking cam 68 with the longitudinal cutout 60 of the stem section 44 till the closure 35 has attained the opening position corresponding to the single opening stroke. In this position, the detent contour extending radially and in the peripheral direction on both sides of the longitudinal cutout 60 is located in the area of the detent contour 68 fixed radially. Since the locking means in the region of the detent contour 61 is released to perform a rotation under the flow medium pressure of vanes or blades 66, the blade grid performs a rotation about a preset peripheral angle and the detent cam 68 engages the detent contour of stem section 44. Then the closure piece 35 is axially blocked on one side as long as the rotary force acting on the blade grid due to flow medium pressure is greater than the restoring force of the torsion spring (not shown). It is evident that in view of the extent of the detent contour 61 on both sides of the longitudinal cutout 60, there will be locking of the closure piece 35 in the single opening position, independently of the direction of the media flow in the valve.

In the position illustrated in FIG. 7, the two closure pieces 25, 35, in their open positions, are in contact via the face surfaces of the valve heads 32, 42, and are prevented by fixed stops from any axial movements. This bayonet-catch-like locking of closure piece 25 in its single opening position is cancelled under the action of the restoring torsion spring when there is no more flow in the valve, or when the two coupling halves are separated by actuating sleeve 15.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

We claim:

1. A quick-closure coupling for hydraulic lines, comprising: two insertable coupling halves, lockable in a coupling position, said coupling halves comprising a plug valve and a sleeve valve each having a closure piece; closure springs for spring loading said closure pieces in closure direction; said closure pieces being held in closed position when said coupling halves are separated; said plug valve of said coupling halves having a first stop restricting and defining a first displacement travel of said closure piece in opening position; said sleeve valve having the closure piece spring-loaded with a stronger spring and having a second stop restricting and defining a second displacement travel equal to twice said first displacement travel of said plug valve closure piece said sleeve valve having locking means capable of locking after axial displacement of one of said closure pieces beyond the first displacement travel and after locking the sleeve valve closure piece returns to its opening position corresponding to said first displacement travel, said locking means reaching a stop position locking said sleeve valve closure piece in said opening position, said locking means moving back during disconnection of said coupling halves to its release position permitting said sleeve valve closure piece to move a distance equal to twice said first displacement travel; said plug valve comprising a plug connected to a pressure source and said sleeve valve connected to a hydraulic device, said closure pieces comprising spring-biased poppet type non-return valves; said poppet valves biasing each other into an open position by moving a predetermined distance upon connection of the coupling halves, the opening travel of the poppet valve in said plug half being limited by said first stop at the open position and the poppet valve of said socket half being capable of moving a distance equal to said second displacement travel for permitting connection of said two coupling halves with pressure remaining in the hydraulic device, the poppet valve of said plug half being held in a closed position by said pressure source while the two coupling halves are being connected so that the poppet valve of the socket half is biased a distance equal to said second displacement travel to said open position.

2. A quick-closure coupling as defined in claim 1 wherein said locking means comprises a stop spring-loaded in a direction of its locking position, said stop being held in a release position when said sleeve valve closure piece is in said closed position and during opening of said sleeve valve beyond said first displacement travel being releasable and capable of locking.

3. A quick-closure coupling as defined in claim 1 including a closure piece guide and a sliding member movable relative to the closure piece of said sleeve valve; said stop being movable perpendicular to said closure piece guide, said locking means stop in said closed position of said closure piece contacting said sliding member, said sliding member being axially displaceable along said closure piece guide co-acting with said closure piece so that during movement of said closure piece from its closed position to its opening position, said sliding member is displaced from a position contacting said stop to a release position, said stop contacting a slide surface of said closure piece detenting in a locking detent position behind said closure piece guide when said closure piece is biased to said opening position.

4. A quick-closure coupling as defined in claim 3 wherein said sliding member on a side facing said closure piece has an oblique surface slipping underneath said stop during return motion of said closure piece to its closed position.

5. A quick-closure coupling as defined in claim 1 wherein said locking means comprises a rotary stop means rotating about an axis coinciding with a flow axis through the coupling, said rotary stop means being movable through a predetermined peripheral angle between its release position and a locked position restricting said closure piece movement to said first displacement travel.

6. A quick-closure coupling as defined in claim 1 wherein said locking means comprises a propeller located rotatably in the hydraulic line, a closure piece guide; a torsion spring; said closure piece guide having an axial cutout; said propeller being held by said torsion spring in a position aligned with said axial cutout and being movable by flow in said sleeve valve to a rotary position displaced relative to said first-mentioned position by a predetermined peripheral angle, said closure piece guide striking a stop surface on said propeller at said predetermined peripheral angle when said first displacement travel is exceeded.

* * * * *